Patented July 9, 1929.

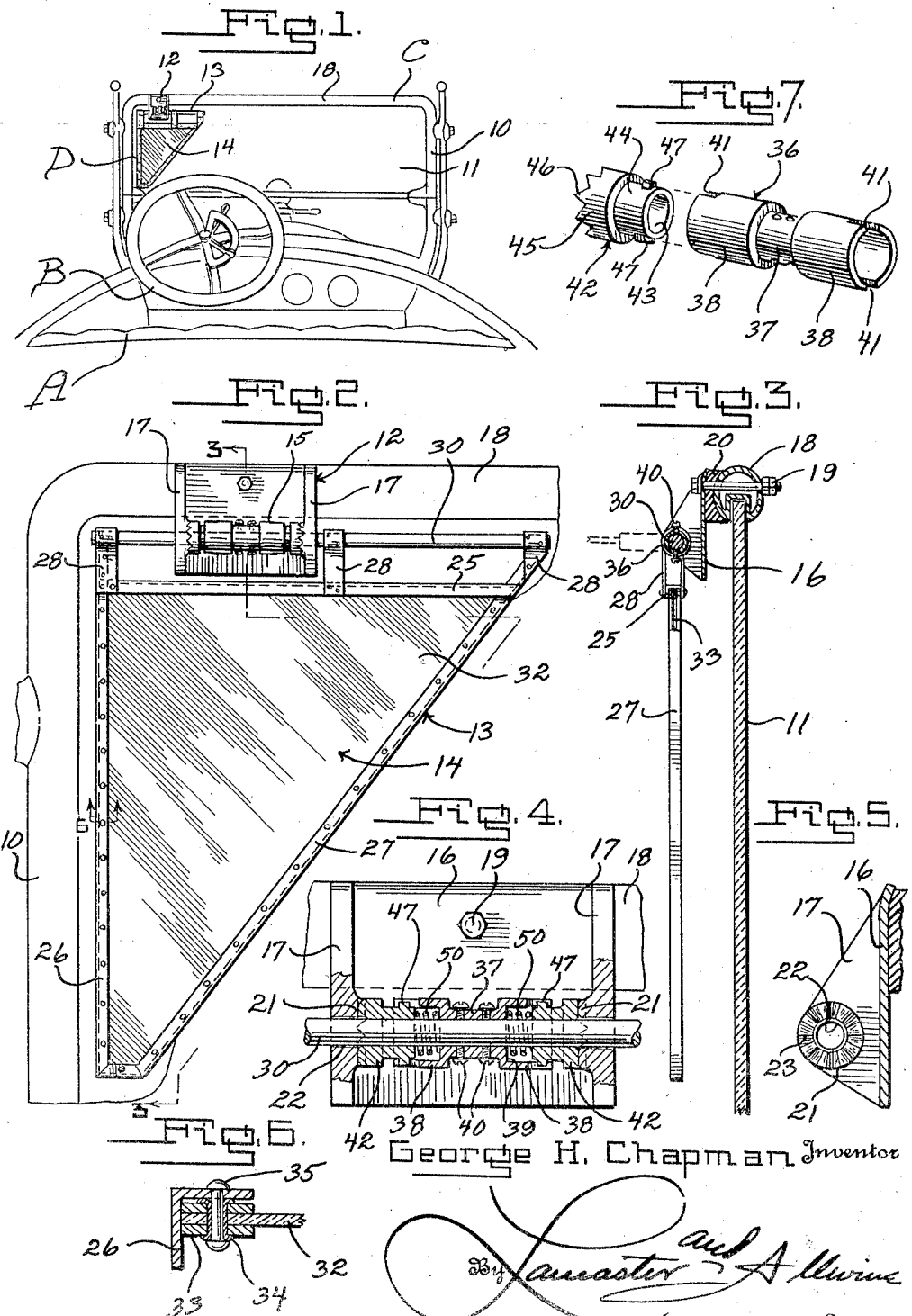

1,719,922

UNITED STATES PATENT OFFICE.

GEORGE H. CHAPMAN, OF PLYMOUTH, MASSACHUSETTS.

VEHICLE LIGHT DIMMER.

Application filed May 6, 1927. Serial No. 189,352.

The present invention relates to improvements in anti-glare or light dimmer attachments for motor vehicles, and the primary object of the invention resides in the provision of an adjustable glare shield which may be readily lowered into an operative position for protecting the eyes of the driver of the vehicle from the direct light rays from headlights of approaching vehicles.

A further object of the invention is to provide a novel type of pivoted glare shield which is of such construction as to not interfere with proper operation of a windshield wiper employed for cleaning the windshield directly in front of the driver, and one wherein the shield proper is of such configuration as to permit of the same being readily swung upwardly to an inoperative position past the steering wheel of the vehicle.

A further object of the invention resides in the provision of a glare shield adapted to be pivotally supported upon the windshield frame, and embodying novel keeper means whereby the shield proper is adjustably retained in either an operative or inoperative position against movement out of either position due to vibration.

A still further object of the invention resides in the provision of a novel type of glare shield which is of extremely simple and durable construction, and one wherein the shield proper is capable of being adjusted transversely of the windshield.

Other objects and advantages of the invention will be apparent during the course of the following detailed description, taken in connection with the accompanying drawing forming a part of this specification and in which drawing:

Figure 1 is a fragmentary view of a motor vehicle and showing the improved glare shield as applied to the windshield thereof.

Figure 2 is an enlarged plan view of the glare shield looking at the same from the rear side of the shield and showing the shield in position upon a windshield frame.

Figure 3 is a vertical section on line 3—3 of Figure 2 and looking in the direction of the arrows.

Figure 4 is an enlarged fragmentary section through the retaining means for adjustably disposing the shield proper at various angles.

Figure 5 is a detailed sectional view through the supporting hanger for illustrating certain details of construction.

Figure 6 is an enlarged fragmentary section on line 6—6 of Figure 2.

Figure 7 is a perspective view illustrating the specific construction of the retaining means for the shield proper.

Referring to the drawing in detail, and wherein similar reference characters designate corresponding parts throughout the several views, the letter A designates a conventional type of motor vehicle embodying the usual steering wheel B and forwardly of which is disposed a windshield C upon which the improved light dimmer or glare shield D is shown mounted.

The windshield C embodies the usual frame 10 for supporting of the glass panels 11, and in certain types of vehicles the steering wheel B is disposed relatively close to the panel 11.

Referring now to the improved glare shield D, the same embodies a hanger 12, a pivoted frame 13, for supporting of a shield proper 14, and a retaining means 15 for adjustably locking the frame 13 in various adjusted angular positions with respect to the windshield panel 11.

Referring first to the specific construction of the support or hanger 12, the same embodies a plate portion 16 provided at each end or vertical edge with rearwardly projecting ears 17. The hanger 12 is preferably secured to the upper or top rail 18 of the windshield frame 10 by means of a bolt 19 passed through the central upper portion of the plate 16 and through the rail 18 above the glass panel 11. A spacing block 20 is disposed between the plate 16 and rail 18 for disposing the plate 16 in a true vertical position and in spaced relation inwardly of the glass panel 11 as illustrated in Figure 3. The upper edge of the plate 16 preferably curves forwardly in contacting engagement with a curved upper edge of the block 20, and this curved upper edge of the plate will allow for the use of a single bolt 19 for securing the hanger to the rail 18 and preventing rocking of the hanger about the bolt 19 as a pivot. Provided on the inner or confronting faces of the ears 17, and disposed in aligning relation, are lugs or projections 21 having circular bores 22 disposed in axial alignment and extending through the ears 17. The inner face of each of the lugs 21 is formed with radially extending teeth 23 which co-act with the retaining means 15 for adjustably retaining the shield proper in its adjusted positions.

Referring now to the hanger frame 13, the same is preferably of triangular shape in plan and includes an upper horizontal rail section 25, an outer vertical rail 26, and an inner angular rail 27 connecting the inner end of the horizontal rail 25 with the lower end of the vertical rail 26. These rail sections 25, 26 and 27 are preferably formed of light gauge angle iron as illustrated in Figure 6, with the top or horizontal rail 25 secured to the rails 26 and 27 in spaced relation below the upper ends of the rails as clearly illustrated in Figure 2. Connected to the upper end of each of the rails 26 and 27, and to the intermediate portion of the horizontal rail, 25, are suitable clips 28 and which clips at their upper end receive against rotation, the cylindrical shaft 30 disposed in parallel relation above the top rail 25 and in right angular relation to the vertical rail 26. This shaft 30 is intended to be rotatably mounted in the aligning bores 22 provided in the lugs 21 of the hanger ears 17. The hanger frame 13 is preferably mounted in the hanger 12 with the vertical hanger frame rail 26 disposed closely adjacent one vertical rail of the windshield frame 10. Thus it will be seen that upon grasping the lower end of the hanger frame 13, that the same may be pivoted in the hanger 12.

Referring now to the shield proper 14, and which is also of triangular shape in plan corresponding to that of the hanger frame 13, the same embodies a screen or visor 32 formed of translucent material such as glass, celluloid, cloth, or an analogous material capable of diffusing light rays, and a carrier frame 33 consisting of thin strips of material disposed one at each side of the screen along the marginal edges of the screen as illustrated in Figure 6, and through which suitably spaced tubular eyelets 34 are passed for securing the strips to the screen and serving as a reinforcement for the marginal edges of the screen. The shield proper is intended to be disposed in the hanger frame 13 and be secured to the rails thereof as by means of suitable rivets or fastening elements 35 passed through one flange of the hanger frame rails and through the tubular eyelets 34.

The means 15 for retaining the shield in adjusted positions, embodies a tubular fixture 36 embodying an intermediate sleeve portion 37 having a bore for slidably receiving the shaft 30, and formed at each end of the sleeve portion 37, is an enlarged cap 38 of tubular formation and providing a shoulder 39 at each end of the sleeve portion 37. This tubular fixture 36 is intended to be fixedly mounted on the shaft 30 between the hanger ears 17 as by means of suitable set screws 40 threaded through the sleeve portion 37 into binding engagement with the shaft. Provided in diametric alignment and opening at the outer end of each of the caps 38, are guide slots 41, and which guide slots serve for retaining against rotation, coacting keepers 42. These keepers 42, and one of which is disposed at each end of the fixture 36, are each provided with a bore 43 for slidable mounting of the keepers upon the shaft 30, and each embodies a tubular shank portion 44 provided at its outer end with an enlarged head 45. The outer surface of each of the heads 45 are provided with radially extending projections or teeth 46 which are adapted for interfitting engagement with the teeth of the respective lugs or projections 21 of the hanger ears 17. The shank portions 44 of the keepers are of a diameter to slidably fit within the openings of the caps 38, and each shank portion is provided with diametrically disposed lugs 47 which project into the slots 41, and which as will be observed will cause the keepers to be rotated with the fixture 36 upon rotation of the shaft 30. Disposed in each of the caps 38, and encircling the shaft 30, with one end abutting against the shoulders 39 and the opposite end abutting with the inner end of the shank portions 44, are expansion coil springs 50 and which as will be observed in Figure 4 act to normally force the keepers 42 in opposite directions and into engagement with their respective lugs 21. The cap 38 also serves as a protection for the spring 50 and thus prevents likelihood of the springs becoming broken.

It is preferred that the teeth 23 of one of the lugs 21 align with the teeth of the companion lug 21, for such will permit of the hanger frame 13 being adjusted in the fixture 36 so that the frame will assume a perfectly vertical position when lowered to an operative position as illustrated in Figure 3. It will also be observed that the hanger frame may be adjusted longitudinally along the windshield frame upon loosening of the set screws 40 and allowing the shaft 30 to slide through the fixture 36.

By so having the shield proper of triangular shape in plan and mounted as shown, will allow for the shield to be readily swung upwardly to an inoperative position past the steering wheel B should the wheel be disposed relatively close to the windshield as is the case with certain types of motor vehicle constructions.

While the interengaging means between the hanger 12 and retaining means 15 has been shown as consisting of interengaging teeth, it will readily be apparent that various other types of friction retaining means may be provided between the keepers 42 and lugs 21 for retaining the shield in adjusted positions.

By observing Figure 4 it will be seen that by so freely mounting the keepers 42 upon the shaft 30, that an equalizing action is provided whereby the shaft 30 is capable of slight longitudinal shifting for allowing the springs 50 to act with an equal pressure upon their respective keepers.

From the foregoing description it will be apparent that a novel and efficient type of light dimmer or glare shield has been provided embodying novel and simplified features of construction whereby the device may be economically constructed, and embodying a retaining means for the shield proper whereby the shield will be positively retained in any of its adjusted positions against movement due to vibration, and which retaining means acts with an equalizing action upon a fixed support whereby both of the keepers will act equally for retaining of the shield in its adjusted position.

Changes in detail may be made to the specific form of the invention herein shown and described, without departing from the spirit of the invention or the scope of the following claims.

I claim:

1. In a device of the class described, a hanger including parallel spaced apart ears, a screen carrying shaft rotatably mounted in the ears, a fixture mounted rigidly on the shaft between said ears and having caps provided at each end thereof, keepers slidably mounted in the cap at each end of the fixture and held for rotation with the fixture, and a spring disposed in each cap and acting upon the keepers for normally urging the keepers in opposite directions and into frictional engagement with the inner faces of the hanger ears.

2. In a device of the class described, a hanger including parallel spaced apart ears, a screen carrying shaft rotatably mounted in the ears, a fixture mounted against rotation on the shaft between said ears and having terminally opening pockets having guide slots formed therein, a keeper mounted on the shaft at each end of the fixture and including shanks slidable in said pockets and a head at the outer end of the shank, said shank portions being provided with lugs engageable in the guide slots of the pockets, and a spring arranged in each pocket and acting upon the respective keepers for normally urging their head portions into frictional engagement with confronting surfaces of the hanger ears.

3. In a device of the class described, a hanger provided with spaced apart ears, a screen carrying shaft rotatably mounted in the ears, a fixture mounted on the shaft between said ears, including an intermediate sleeve portion having enlarged terminal portions providing circular pockets at each end of the fixture, said enlarged terminal portions each being provided with terminally opening guide slots, keepers mounted on the shaft at each end of the fixture and including shank portions slidable in the pockets and terminal head portions frictionally engageable one with each of the hanger ears, said shank portions each being provided with lugs slidable in the guide slots provided in the terminal portions of the fixture, and a coil spring disposed in each pocket with one end acting against the sleeve portion of the fixture and the opposite end acting upon the shank portion of the keepers for normally urging the head portions of the keepers into frictional engagement with the hanger ears.

4. A position holding means for rotatable shafts, comprising a hanger provided with parallel spaced apart ears, said ears being provided with bearing portions for rotatably receiving the shaft, said bearing portions projecting inwardly from the ears and provided at their inner faces with a series of radially extending teeth, a fixture for mounting on the shaft between said ears, including an intermediate sleeve portion for rigid attachment with the shaft and enlarged terminal portions providing terminally opening pockets at each end of the fixture, said enlarged terminal portions being provided with diametrically disposed guide slots, co-operating keepers mounted in the pocket at each end of the fixture, including lugs projecting into the guide slots at each end of the fixture and terminal head portions having a series of radially extending teeth provided in their opposed faces for engagement with the teeth of said bearing portions, and an expansion coil spring disposed in each pocket between the keepers and sleeve portion of the fixture for normally urging the keepers into engagement with the hanger ears.

5. In a device of the class described, a hanger having a rearwardly projecting apertured ear provided at each end thereof, a shaft rotatable in the apertures in the ears and projecting past the ends of the hanger, a hanger frame including an upper rail, arms connecting said rail and shaft in spaced relation and spaced apart a distance greater than the width of the hanger, a tubular member mounted on the shaft between said ears, means for adjustably connecting the tubular member to the shaft, spring pressed keepers at each end of the tubular member and normally urged into frictional engagement with the confronting surfaces of said ears, and a shield proper mounted in the hanger frame.

GEORGE H. CHAPMAN.